Patented Dec. 15, 1925.

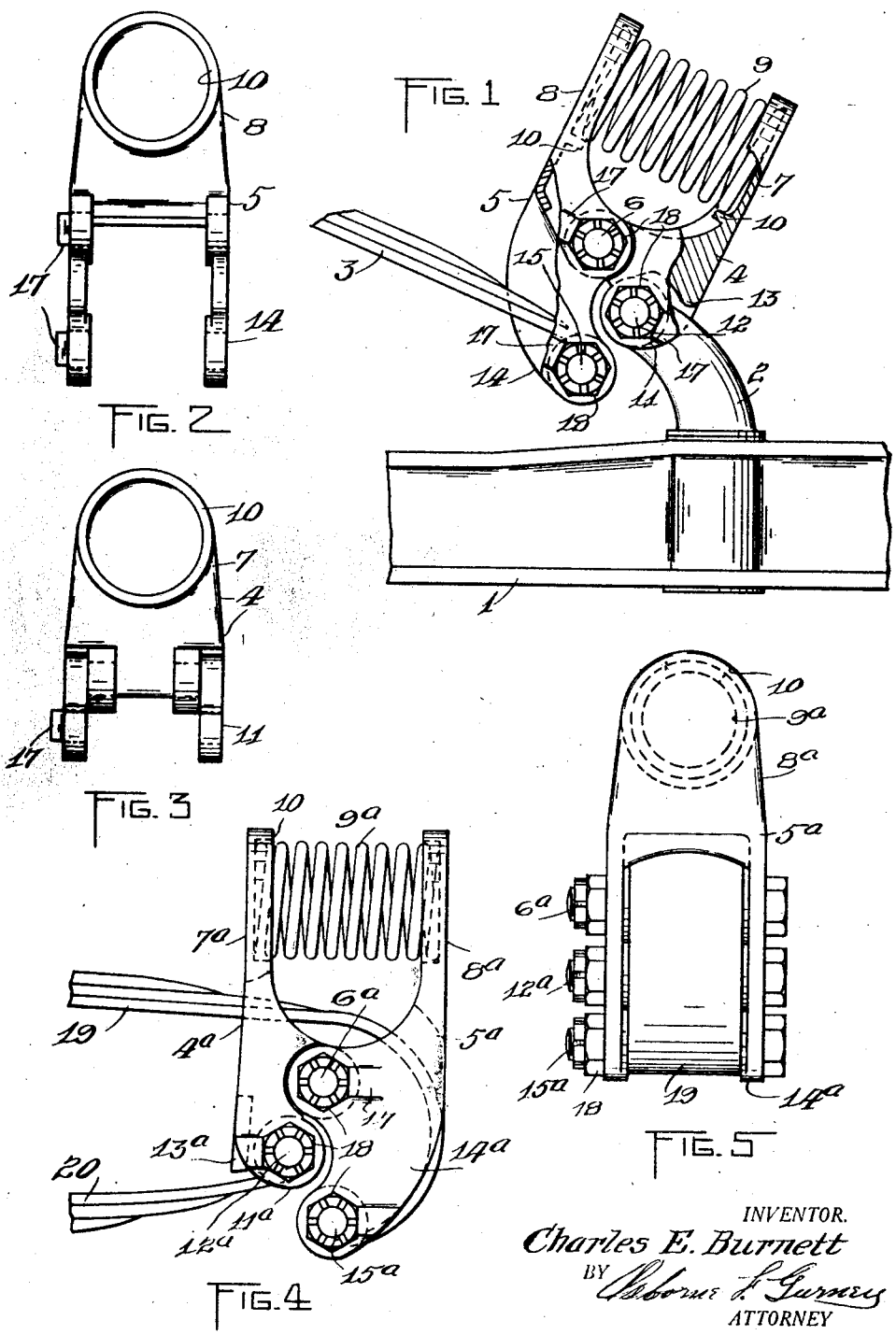

1,566,071

UNITED STATES PATENT OFFICE.

CHARLES E. BURNETT, OF CANANDAIGUA, NEW YORK; THE CITIZENS BANKING AND TRUST CO., ADMINISTRATOR OF SAID CHARLES E. BURNETT, DECEASED, ASSIGNOR OF ONE-HALF TO GEORGE C. SAYLOR AND ONE-HALF TO CHARLES B. O'BRIEN, BOTH OF CONNEAUT, OHIO.

FLEXIBLE SHACKLE.

Application filed June 22, 1922. Serial No. 570,214.

*To all whom it may concern:*

Be it known that I, CHARLES E. BURNETT, a citizen of the United States, and a resident of Canandaigua, in the county of Ontario and State of New York, have invented a new and Improved Flexible Shackle, of which the following is a specification.

My invention relates to shock absorbers or snubbers for vehicles, more especially motor vehicles, and although adaptable for use with different forms of body springs is particularly intended for use on vehicles of the Ford type in which the body springs extend transversely of the car.

An object of the invention is to provide a device of the character described that may be substituted for the usual body spring shackles furnished on the car by the manufacturer, the device functioning as a shackle but with flexibility in such manner as to cushion the ends of the body spring when the latter is forced downward under load, to act as a snubber in offering flexible resistance to the rebound of the spring, and to absorb shocks due to side sway of the car body.

Another object of the invention is to provide a balanced flexible shackle, that is,— one in which an auxiliary compression spring is employed in the connection between the body spring and axle but without bearing directly against either of such members.

A further object of the invention is to provide a flexible shackle to be substituted for the usual shackle on cross spring cars and so constructed as not to require any machine work in making the substitution nor the raising of the body spring with respect to the axle.

And, a still further object of the invention is to provide a flexible shackle that is strong in construction, of but few parts, quickly attachable, and operating in a way to add durability to the car and comfort in riding.

To these and other ends the invention consists of certain parts and combinations of parts all of which will be fully set forth in the following description and particularly defined in the appended claims.

The accompanying drawings illustrating the invention are as follows:—

Figure 1 is a side view of the device attached to the body spring and axle of a vehicle of the Ford type, parts of the device being broken away to show details of construction.

Fig. 2 is an inner face view of one of the shackle members.

Fig. 3 is an inner face view of the other shackle member.

Fig. 4 is a side view of the device in modified form and showing a different mounting.

Fig. 5 is an end view from the right of the parts shown in Fig. 4.

Similar reference numerals refer to similar parts throughout the several views.

Referring first to Figs. 1, 2 and 3:—

The numeral 1 represents the front axle on which an inturned perch 2 is mounted and 3 a cross body spring lying substantially in the same vertical plane as the axle. The connection between the perch and body spring is a flexible shackle formed of two levers 4 and 5 having a common fulcrum 6 intermediate their ends and having their outer arms 7 and 8, respectively, spaced apart by means of a coiled compression spring 9 seated within annular flanges 10 on the inner faces of such outer arms.

The inner arms 11 of the lever 4 is bifurcated to engage each side of the perch 2 and has pivotal connection with the perch by means of a bolt 12, the side plates of the inner arm being bridged by a web or snubber 13 formed to co-operate with the overhanging arm of the perch.

The inner arm 14 of the lever 5 is bifurcated to astride the body spring 3 and has pivotal connection with the end of the spring by means of a bolt 15, this arm being longer than the arm 11 of the lever 4 and curved so as to engage under the end of the inturned perch the end of which lies intermediate the bolts 6 and 15. Lugs 17 on the side faces of the lever members engage side faces of the nuts 18 on the bolts 6, 12 and 15 to lock the nuts and their respective bolts against turning on each other and thus becoming loose. The shackle device lies in the plane of the axle and body spring and is inclined outwardly with respect to the vertical, the centers of the bolts 6 and 15, in this instance, being approximately equal distances from the center of the pivot bolt 12. The relative positions of the three pivotal connections 6, 12 and 15 and the strength of the compression spring 9 are the factors involved in effecting a balance of the shackle so that the spring 9 will function both on the downward and rebound movements of the body spring and without bearing directly against either the body spring or axle.

In operation the load on the body spring 3 will force the same downwardly and the ends laterally, only one end of the body spring being shown in the drawing. This action will cause the shackle formed of the levers 4 and 5 to swing about the pivotal connection 12 and at the same time pull the inner arms of the levers apart so that the levers turn in opposite directions about their common fulcrum 6 which results in a cushioning of the end of the body spring through the compression of the spring 9 between the outer ends of the levers. On the rebound of the body spring the shackle levers 4 and 5 will turn about the pivotal connection 12 until the snubber 13 engages the perch 2 at which time the levers will turn in opposite directions on the fulcrum bolt 6, the compression of the coiled spring 9 offering a flexible resistance to the rebound of the body spring.

In the modification of the invention shown in Figs. 4 and 5, the relative positions of the levers 4ª and 5ª, similar to the levers 4 and 5, are reversed so that the lever 5ª is the outer member of the pair and 4ª the inner member. In this instance the levers form a vertically arranged shackle for connecting the ends of two opposed portions 19 and 20 of an eliptic side spring, the upper spring member 19 having its end curved to engage around and under the corresponding end of the bottom spring member 20.

The levers 4ª and 5ª are fulcrumed intermediate their ends at 6ª and held between the outer arms 7ª and 8ª of the levers is a coiled spring 9ª. The inner arms of the levers are bifurcated, the inner arm 11ª of the lever 4ª straddling the upper spring member 19 and having pivotal connection 12ª with the end of the lower spring member 20, while the inner end 14ª of the lever 5ª is bifurcated to engage on both sides of the curved end portion of the upper spring member and has pivotal connection 15ª with the end of such spring member. The lever 4ª is formed with a snubber 13ª adapted to engage the lower spring member on the rebound of the body spring, the levers 4ª and 5ª swinging on the fulcrum 6ª to compress the coiled spring which flexibly resists such rebound. When the spring members 19 and 20 are under load, the ends of such body spring members are cushioned by the compression of the spring 9ª.

It is believed that from the foregoing the construction and operation of the flexible shackle are sufficiently clear to call for no further explanation herein.

What I claim is:—

1. In a device of the character described, the combination with two relatively movable members one of which is a vehicle body spring, of a balanced flexible shackle formed of two upwardly extending levers having a common fulcrum intermediate their ends, the inner arms of said levers being pivotally connected one with one member and one with the other member, a compression spring engaging between the outer arms of said levers, both arms at all times being independent of direct bearing against either of said members, and a stop on one lever adapted on the rebound of the body spring to engage the member to which such lever is pivoted.

2. In a device of the character described, the combination with two relatively movable members one of which is a vehicle body spring, of a balanced flexible shackle formed of two upwardly extending levers having a common fulcrum intermediate their ends, the inner arms of said levers being of different lengths and having pivotal connection one with one of said members and one with the other member, a compresison spring engaging between the outer arms of the levers, the levers moving in opposite directions on said fulcrum on both the downward and rebound movements of the body spring, and means formed on the lever having the shorter inner arm for engaging the member to which it is pivoted to effect such relative lever movement on the rebound of the body spring, said lever at all times being free from contact with the body spring.

3. In a device of the character described, the combination with an inwardly curved perch, a support for the perch, and a body spring, of a balanced flexible shackle formed of two upwardly and outwardly extending lever members having a common fulcrum intermediate their ends, the inner arm of one lever having pivotal connection with an end of the spring and the inner arm of the other lever having pivotal connection with the perch, such inner arms moving relatively from each other on the downward movement of the body spring, a compression spring engaging between the outer arms of the levers, and means formed on the perch lever for engaging the perch on the rebound of the body spring to effect movement of the levers to compress the interposed spring, said levers at all times being free from contact with the body spring.

4. In a device of the character described, the combination with an inwardly curved perch, a support for the perch, and a body spring, of a balanced flexible shackle formed of two upwardly and outwardly extending levers having a common fulcrum intermediate their ends, the inner arms of one lever being bifurcated to straddle the spring and having pivotal connection with the spring, the inner arm of the other lever being bifurcated to engage over the perch and having pivotal connection with the perch, such inner arms moving relatively from each other on the downward movement of the body spring, a coiled compression spring engaging between and seated in the outer arms of the levers, and means formed on the perch lever for engaging the perch on the rebound of the body spring to effect movement of the levers to compress the interposed spring, said levers at all times being free from contact with the body spring.

5. In a device of the character described, the combination with an inwardly curved perch, a support for the perch, and a body spring, of a balanced flexible shackle formed of two upwardly and outwardly extending levers having a common fulcrum intermediate their ends, the inner arm of one lever having pivotal connection with the perch, and the inner arm of the other lever being curved to engage under the inwardly turned perch and having pivotal connection with an end of the spring, such inner arms moving relatively from each other on the downward movement of the body spring, a compression spring engaging between the outer arms of the levers, and means formed on the perch lever for engaging a fixed part on the rebound of the body spring to effect movement of the levers to compress the interposed spring, said levers at all times being free from contact with the body spring.

6. The combination with two relatively movable members, one of which is a body spring, of a balanced flexible shackle formed of two upwardly extending levers having a common fulcrum intermediate their ends, the inner arms of said levers being of different lengths with their ends having pivotal connection one with one of said members and the other with said other member, the pivotal connection of the longer arm underlying that of the shorter arm with said two connections lying in a plane at a slight angle to a substantially median line between and parallel to the two levers, a compression spring engaging between the outer arms of the two levers, and means formed on the lever having the shorter inner arm for engaging the member to which it is pivoted to effect compression of said last named spring on rebound of the body spring, said levers at all times being free from contact with said body spring.

7. The combination with an inwardly curved perch, a support for the perch, and a body spring, of a balanced flexible shackle formed of two upwardly and outwardly extending lever members having a common fulcrum intermediate their ends, the inner arms of said levers being of different lengths with their ends having pivotal connection one with said perch and the other with said body spring, the pivotal connection of the spring underlying that of the perch and the two connections lying in a plane at a slight angle to a median line between and parallel to the two lever members, a compression spring engaging between the outer arms of the two levers, and means on the perch lever for engaging the perch on rebound of the body spring to effect compression of said compression spring, said levers at all times being free from contact with said body spring.

8. In the device of the character described, the combination with a perch, an axle supporting the perch, and a transverse body spring of a balanced flexible shackle, formed of two upwardly extending levers, having a common fulcrum, the inner arm of one lever having pivotal connection with the end of the said body spring, but being otherwise independent thereof, and the arm of the other lever pivoted to the perch, a compression spring acting between the upper lever members, the two levers moving inwardly together under load conditions, and acting simultaneously to compress the lever spring.

9. In the device of the character described, the combination with a perch, a support for the perch, and a body spring of a balanced flexible shackle formed of two upwardly extending levers having a common fulcrum, the lower arm of one lever having pivotal connection with the end of the spring, and the lower arm of the other lever pivoted to the perch, a compression spring acting between the upper arms of the two levers, and means formed on the perch lever for engaging the perch on the rebound of the body spring to effect the movement of the levers to compress the interposed spring, said levers being free from contact with the body spring.

10. In a device of the character described, the combination with two relatively movable members, one of which is a vehicle body spring, of a balanced flexible shackle, formed of two upwardly extending lever members having a common fulcrum upon each other, the inner lever member being pivotally connected to the end of the body spring, but being otherwise independent thereof, and the outer lever member having pivotal connection with the other of said relatively movable members, a compression spring acting between the two upper ends of the lever members, and the outer lever member being formed with a stop permitting a limited common movement upward followed by compression of the lever spring under recoil conditions.

CHARLES E. BURNETT.